US011972641B2

(12) United States Patent
Joyce et al.

(10) Patent No.: US 11,972,641 B2
(45) **Date of Patent: *Apr. 30, 2024**

(54) EXPRESS VOTING

(71) Applicant: Everyone Counts, Inc., San Diego, CA (US)

(72) Inventors: Eric James Joyce, San Diego, CA (US); Craig Harold Reines, Mercer Island, WA (US); Anthony Kelly, San Diego, CA (US)

(73) Assignee: Everyone Counts, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/134,605

(22) Filed: Sep. 18, 2018

(65) Prior Publication Data

US 2019/0259234 A1 Aug. 22, 2019

Related U.S. Application Data

(63) Continuation of application No. 14/163,952, filed on Jan. 24, 2014, now Pat. No. 10,109,129.

(60) Provisional application No. 61/756,411, filed on Jan. 24, 2013.

(51) Int. Cl.
*G07C 13/00* (2006.01)

(52) U.S. Cl.
CPC ......... *G07C 13/00* (2013.01); *G06Q 2230/00* (2013.01)

(58) Field of Classification Search
None
See application file for complete search history.

(56) References Cited

U.S. PATENT DOCUMENTS

2006/0155999 A1* 7/2006 Holtzman ............... H04L 29/06 713/172
2008/0105742 A1* 5/2008 Kim .................. H04W 12/0013 235/386
2008/0135632 A1* 6/2008 Haas ...................... G07C 13/00 235/50 B
2009/0076891 A1* 3/2009 Cardone ................ G07C 13/00 235/386
2010/0127064 A1* 5/2010 Barnes .................... H04L 67/18 235/51

(Continued)

OTHER PUBLICATIONS

Castro, "50 Ideas for More Accessible Elections" (Dated Oct. 2012), The Information Technology and Innovation Foundation, Retrieved from: http://www2.itif.org/2012-fifty-ideas-accessible-elections.pdf (Year: 2012).*

*Primary Examiner* — Steven S Kim
*Assistant Examiner* — Jason B Fenstermacher
(74) *Attorney, Agent, or Firm* — Mintz Levin Cohn Ferris Glovsky and Popeo, P.C.

(57) ABSTRACT

Methods and apparatus, including computer program products, are provided for express voting. In some example embodiments, there is provided a method for express voting. The method may include authenticating a voter based on a token carried by a user equipment, the token mapped to at least one of an identity of the voter, a precinct of the voter, and a ballot for the voter; and providing, when the authenticating indicates the voter is authorized to vote, the ballot presented on the user equipment. Related systems, methods, and articles of manufacture are also disclosed.

15 Claims, 3 Drawing Sheets

(56) References Cited

U.S. PATENT DOCUMENTS

| | | | | |
|---|---|---|---|---|
| 2012/0330732 | A1 * | 12/2012 | Kaplan | G06Q 10/00 705/12 |
| 2014/0224872 | A1 * | 8/2014 | Griggs | G07C 13/00 235/380 |

* cited by examiner

EXPRESS VOTING

CROSS REFERENCE TO RELATED APPLICATION

This application claims priority under 35 U.S.C 119(e) to U.S. Provisional Patent Application Ser. No. 61/756,411, filed Jan. 24, 2013, titled, "Express Voting." Priority of the filing date of the Provisional patent application is hereby claimed. The disclosure of the Provisional patent application is incorporated by reference herein in its entirety.

TECHNICAL FIELD

The subject matter disclosed herein relates to voting.

BACKGROUND

Voting is fundamental to a democracy. However, there are often numerous obstacles to voting. For example, long lines on Election Day have discouraged may potential voters from voting. Indeed, some of these discouraged voters have turned to mail-in, absentee ballots, but often these ballots are not even counted by a jurisdiction unless the election results are extremely close and thus within a tight margin, so discouraged voters may be even less inclined to vote when they realize their votes might not be counted.

SUMMARY

In some example embodiments, there is provided a method for express voting. The method may include authenticating a voter based on a token carried by a user equipment, the token mapped to at least one of an identity of the voter, a precinct of the voter, and a ballot for the voter; and providing, when the authenticating indicates the voter is authorized to vote, the ballot presented on the user equipment.

Articles are also described that comprise a tangibly embodied computer-readable medium embodying instructions that, when performed, cause one or more machines (for example, computers, etc.) to result in operations described herein. Similarly, apparatus are also described that can include a processor and a memory coupled to the processor. The memory can include one or more programs that cause the processor to perform one or more of the operations described herein.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

DETAILED DESCRIPTION

Figure 1:
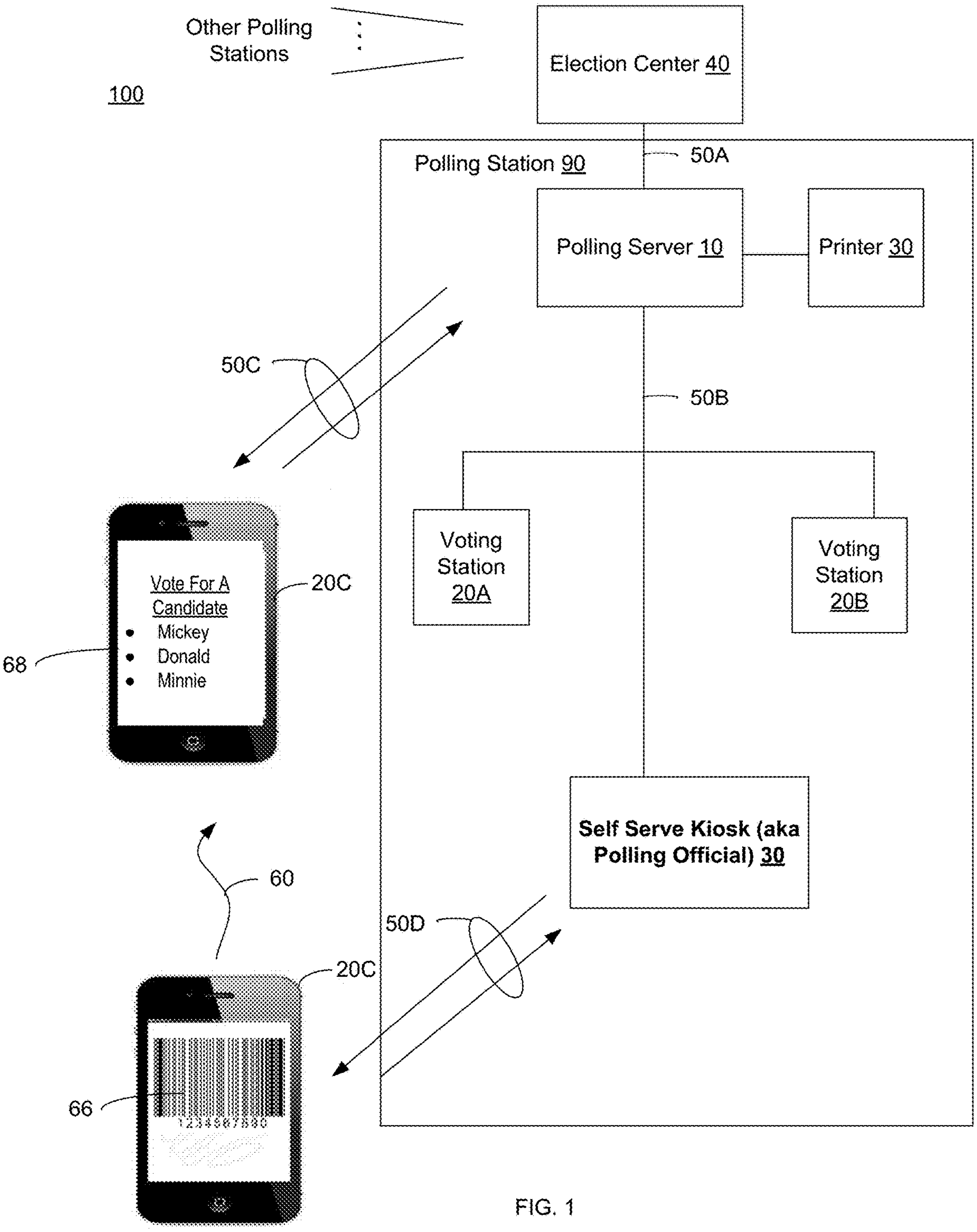
FIG. 1 illustrates an example of a block diagram of a voting system, in accordance with some example embodiments.

FIG. 1 depicts a voting system 100 including user equipment 20C, such as a smart phone, tablet computer, notebook computer, and the like, configured for express voting. In some example embodiments, user equipment 20C may be used for express voting. For example, a potential voter having user equipment 20C may approach a polling station including a polling official at a data processor, such as self-serve kiosk 20, to enable authentication of the potential voter. In some example embodiments, the authentication process may be expedited. For example, the potential voter having user equipment 20C may have a token 66, such as a bar code, a radio frequency identifier (RFID), and the like. The token 66 may be obtained prior to voting by accessing a server, where the potential voter may authenticate his or her identity. In addition to, or alternatively, the potential voter may receive via regular mail or email, voting materials which enable the potential voter to obtain the token 66. For example, the user may enter a code contained in a mailing from the board of elections, access a server, such as a web server, to obtain token 66, which may be downloaded to user equipment 20C. The mailing may include token 66, in which case the token may be printed or included in the mailing from the board of elections, so the user can either take the mailing to the polling station or take a photo of the token contained in the mailing to the polling station.

With token 66, a potential voter carrying user equipment 20C including token 66, may move to an express voting queue. This express voting queue may allow the user equipment 20C including token 66 to be presented at self-serve kiosk 30, which detects token 66. For example, self-serve kiosk 30 may scan or take a picture of token 66, decode token 66, map token 66 to the identity of the potential voter at user equipment 20C, and, if authorized, direct the voter to one of the voting stations 20A or 20B and/or provide a printed ballot. The express voting may be further expedited by providing a ballot 68 to user equipment 20C, so that the potential voter at user equipment 20C may make selections and submit the selections to polling server 10 to submit the voting selections. In some example embodiments, user equipment 20C may request that the submitted selections be printed at 30, so that the user at user equipment 20C can verify his or her selections before casting them to the polling server 10, although this verification may be performed electronically as well via a monitor. Accordingly, the subject matter disclosed herein allows a potential voter at user equipment 20C to vote in an expedited or express way by at least being authenticated using the self-serve kiosk 30 and token 66 and/or being able to vote via ballot 68 provided to user equipment 20C after authentication.

The self-serve kiosk 30 may comprise at least one processor, at least one memory, and at least one user interface. The self-serve kiosk 30 may be coupled to polling server 10 by communication medium 50A, such as via a wired and/or wireless network. In some example embodiments, the self-serve kiosk 30 may include an interface, such as a scanner, for reading token 66. Once read the token 66 is read, the self-serve kiosk 30 may, in some example embodiments, ask the voter for other information, such as an address, a picture identification (ID), and the like. Next, self-serve kiosk 30 may access a repository including voter registration information to authenticate that the voter is eligible to vote and/or vote in the precinct at which the voter is attempting to vote. If authorized, the self-serve kiosk 30 may also determine the correct ballot (e.g., with the appropriate selections on the ballot) for the voter, and/or direct the voter to a voting booth, such as stations 20A-B. The self-serve kiosk 30 may also allow the voter to receive a ballot on user equipment 20C and/or allow the user to request a printer ballot. Although the self-serve kiosk 30 may operate autonomously without a polling official, the self-serve kiosk 30 may be monitored and/or include one or more inputs from the polling official (e.g., confirming that the voter matches a government issued picture identification card, and the like).

Voting stations 20A-B may each be coupled to the polling server 10 by a communication medium 50, such as via a wired and/or wireless network. Although FIG. 1 illustrates two voting stations 20A-B, the number of devices may vary in quantity and type. For example, voting station 20A may be a tablet computer, and a second voting station 20B may be specifically specifically built for voting. One or more of the voting systems 20-B may allow a user to vote using a web browser, a dedicated voting application program (sometimes called an "app"), a voice-activated system, and/or a gesture-based controller. Voting stations 20A-B may be used by voters to perform one or more of the following: enter/load a credential, such as token 66; view ballots, such as ballot 68; select choices for contests on the ballots; and/or submit the selections so that they can be counted at the voting stations 20A-B and/or polling server.

In some example embodiments, one of the voting stations comprises user equipment 20C. User equipment 20C may be implemented as a mobile wireless device and/or a stationary device. For example, user equipment 20C may be implemented as a mobile wireless device, a mobile station, a smart phone, a wireless terminal, tablets, a wireless handheld device, a wireless plug-in accessory, or the like. In some example embodiments, user equipment 20C may configured to operate using a plurality of radio access technologies including one or more of the following: cellular technologies, such as Long Term Evolution (LTE), wireless local area network (WLAN) technology, such as for example 802.11 WiFi and/or the like, Bluetooth, Bluetooth low energy (BT-LE), near field communications (NFC), and any other radio access technologies. User equipment 20C may be provided by the voting user or, in some instances, provided by a polling official at polling station 90.

The token 66 may comprise a bar code as depicted at FIG. 1, although other machine-readable indicators may be used as well including RFID, a two-dimensional bar code, a biometric, a secret key, a subscriber identity card (or identity value therein) card carried by user equipment 20C, an International Mobile Subscriber Identity (IMSI), a media access control address, and the like. In the case of the bar code, the bar code may encode a unique number that maps to the identity of the voter. The bar code may also encode other information including a voter's address, an identification of the voter's precinct, an identification of a specific ballot for the voter, an identification of a specific ballot style, and the like. In some example embodiments, the token 66 comprising the bar code may be obtained from a web server as part of the voter registration process, while in other embodiments, the bar code may correspond to a bar code obtained from a Government Issue identification (ID) card, such as a driver's license. In some example embodiments, multiple bar codes may be used with a ballot.

In some example embodiments, the token 66 may comprise a smart card, such as a Common Access Card (CAC) used by the U.S. Department of Defense, and/or a bar code printed on a government issued identity card, such as a driver's license. When this is the case, the holder may scan (e.g., read, receive, image, and the like) token 66 and then be directed to one of the voting stations 20A-B, handed a printed ballot, and/or provided with an electronic version of the ballot, which can be sent to user equipment 20C.

The polling server 10 may include at least one processor and at least one memory. The polling server 10 may receive voter credentials, such as token 66, authenticate voter eligibility to vote, supplies appropriate ballots, such as ballot 68 to voters, receive contest selections from the voters, and provide the votes in a ballot box for tabulation. The printer 30 may be used to print a physical record of the voting results before these results are sent to an election center 40.

The printer 30 may be used in some embodiments. For example, printer 30 may be used to print paper ballots. The paper ballots can be blank ballots for voter completion or can be completed ballots that are printed, for example, for verification or tabulation. A printed ballot may include machine-readable indicia that encode information about the ballot. Aspects of such ballots are described in U.S. patent application Ser. No. 13/433,042, filed Mar. 28, 2012, which is hereby incorporated by reference in its entirety. The printer 30 may also be used to print other documents, for example, tabulations of cast ballots or affidavits for voter affirmation. In some embodiments, the voting stations 20A-B and user equipment 20C may print cast ballots on a printer 30, without the ballots being collected by polling server 10.

The polling server 10 may couple to election center 40 via a communication medium 50A. The election center 40 can provide information about voter eligibility and which ballot should be served to the voter. The election center 40 can also collect cast (or completed) ballots from polling server 10, audit election results, tally the election results from polling server 10 as well as other polling stations. In some example embodiments, the link 50A is encrypted for security. Moreover, the collected cast (or completed) ballots may take the form of an electronic summary of all of the votes cast at a polling station, images of the ballots cast at a polling station, paper ballots collected from a polling station, and a bar code printed on an image of the ballots cast at a polling station, wherein the bar code contains the election results for the ballot (or a plurality of ballots, in which case the bar code represents a cumulative summary of the votes cast).

Although represented as one element in FIG. 1, the election center 40 may include many physical devices distributed over multiple locations. In some example embodiments, the election center 40 may include distributed computer servers. Communications between the polling station 90/polling server 10 and the election center 40 may occur before, during, or after deployment of polling station 90/polling server 10. Accordingly, polling station 90/polling server 10 can be used for polling with or without link 50A.

The devices at FIG. 1 may be coupled via communication medium 50A-D. For example, communication medium 50A-D may be any type of communications mechanism and may include, alone or in any suitable combination, the Internet, a telephony-based network, a local area network (LAN), a wide area network (WAN), a dedicated intranet, a wireless LAN, an intranet, a wireless network, a bus, or any other communication mechanisms. Further, any suitable combination of wired and/or wireless components and systems may provide communication links 50A-D. Moreover, communication medium 50A-D may be embodied using bi-directional, unidirectional, or dedicated communication links. Links 50A-D may also support standard transmission protocols, such as Transmission Control Protocol/Internet Protocol (TCP/IP), Hyper Text Transfer Protocol (HTTP), or other protocols.

In some example embodiments, a voter may use a data processing device, such as user equipment 20C and the like, to access an election server, such as polling server 10 and/or another server where registration, ballot making, and/or other voted related activities may be performed. The election server may provide a ballot to the user equipment 20C. The voter may then select choices for contests on the ballot using the user equipment 20C, and the completed ballot may be printed or generated as an electronic document. The printed ballot and/or the electronic ballot may include one or more machine-readable indicia that indicates the voter's choices. This machine-readable indicia, such as a bar code, may be used to expedite voting.

For example, a voter may go to polling station 90, approach a terminal, such as voting station 20A, kiosk 30, and the like, so that the terminal can scan the bar code which represents the voter selections from the ballot. Once scanned, the selections may be submitted to polling server 10 to enable tabulation. Alternatively, or in addition to, the voter may receive a message, such as a text message, email, and the like, confirming that the vote selections were received by the terminal. In some example embodiments, the message may be used for verification. For example, the voter may be required to enter a code from the message before the voting results are forwarded to polling server 10 for tabulation.

In some example embodiments, a bar code on the ballot may also be used to verify the voter's choices (for example, the voter can scan the ballot at a voting station 20A, kiosk 30, and/or other device at polling station 10 to preview and thus verify the voting selections before finally casting the selections), to facilitate counting ballots, and/or auditing ballots. In some example embodiments, a transcriber, as described in U.S. Patent Application Publication No. 2012/0248185, entitled "Systems and Methods for Remaking Ballots," may be used to scan the voter-generated ballot and decode the voter's choices. The transcriber may also be used to print a remade ballot that is formatted like a conventional ballot. To illustrate, further, the voter may access user equipment 20C, download and view a ballot 20C either at home or at the polling station 90, make selections, verify his or her identity, verify the selections made on the ballot (e.g., using the bar code as noted above), and then submit the selections to the polling server 10.

Figure 2:
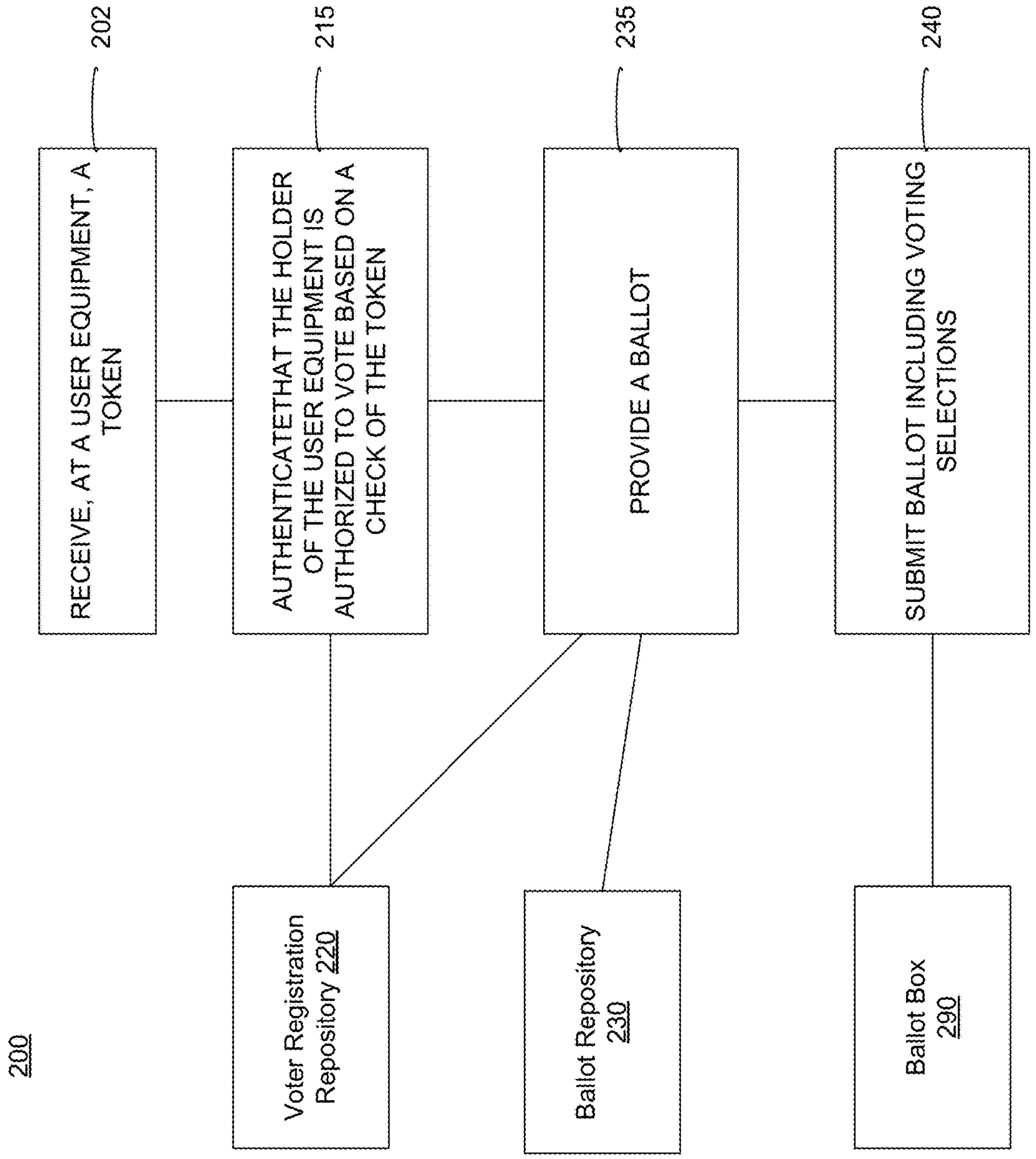
FIG. 2 illustrates a process flow for express voting, in accordance with some example embodiments.

FIG. 2 depicts a process 200 for express voting, in accordance with some example embodiments. The description of process 200 also refers to FIG. 1.

At 202, user equipment 20C may receive a token 66. The potential voter/user of user equipment 20C may include the received token 66, such as a bar code and the like. The token 66 may be received prior to voting by accessing a server, such as a website, where the potential voter/user may authenticate his or her identity and, in response, receive the token 66. In addition to, or alternatively, the potential voter/user may receive via regular mail, voting materials which enable the potential voter to obtain the token. For example, the potential voter/user may enter a code contained in the mailing from the board of elections, access a server, such as a web server, to obtain a token 66, which may be downloaded to user equipment 20C. The mailing itself may include the token 66, so that the user may either take the mailing (or token therein) or take a photo of the token contained in the mailing to the polling station. In any case, the token 66 may be taken to self-serve kiosk 30, which detects the token 66. In the case of token 66, the self-serve kiosk 30 may scan or take a picture of the token 66, decode the token 66, map the token 66 to the identity of the potential voter at user equipment 20C, and, if authorized, direct the voter to a voting station 20A or 20B, provide a ballot 68 as shown at FIG. 1, and/or provide a printed ballot.

At 215, the user equipment 20C may be authenticated. When user equipment 20C accesses self-serve kiosk 30, self-serve kiosk 30 may authenticate the user equipment 20C (e.g., the identity of the holder of the user equipment 20C) to determine whether the user of user equipment 20C is authorized to vote and, if authorized, in what contests the user may vote and/or what ballot to provide to the voter. For example, self-service kiosk 30 may read the token 66 and access the voter registration repository 220, where the token 66 is mapped to the identity of the voter, such as the user of user equipment 20C.

The voter registration repository 220 may be used as a repository containing records of voters who may vote at system 100. And, the records may include an indication of whether the voter was assigned a token, such as token 66. For example, one or more voters in voter registration repository 220 may be assigned a token, so when the self-serve kiosk 30 reads the token 66, the identity of the voter is known and whether the voter is authorized to vote and/or in what jurisdiction (or ballot) the voter is supposed to vote in (or with). In some example embodiments, the token 66 may be mapped to a specific jurisdiction and/or ballot as well the voter's identity as noted above. When this is the case, voter registration repository 220 may, based on token 66, also identify the specific ballot to be used with the voter having token 66. The identity of the specific ballot may be used to access an appropriate ballot (e.g., having the correct candidates and the like) for the specific jurisdiction or precincts. And, this ballot may be served at 235. In some example embodiments, the voter registration is pre-loaded before an election into polling server 10 to enable voter authentication.

At 235, a ballot is provided. For example, the ballot repository 230 may store ballots for the different contests available in an election. The ballot repository 230 may also store formatting information for how the ballot information is to be presented to voters. The ballot repository 230 can include repositories for multiple jurisdictions (for example, all states and territories). The data may be stored as Election Management System (EMS) files. Based on voter identity and/or a location/precinct assigned to the voter (which may be provided by the voter registration repository 220), the ballot repository 230 may provide the correct ballot to polling server 10, voting station 20A-B, printer 30, and/or user equipment 20C. In some example embodiments, the ballots may be pre-loaded before an election into polling server 10, and provided at 235 when the voter is authenticated. As noted above, in some example embodiments, the ballot may be provided before the voter arrives at the polling station 90.

At 240, the ballot including selections may be submitted to a ballot box 290 and/or polling server 10. Referring to ballot 68, a selection may be made casting a vote for "Minnie." Once selected, the voter may submit this vote to polling server 10 and/or the ballot box 290, so that it can be counted with the votes of others. However, in some example embodiments, the voter may preview the selections before submitting them to ballot box 290. For example, the selections can be printed or displayed electronically based on a bar code encoding the selections made by the voter, and if the voter agrees that the ballot accurately reflects the selections, the ballot including the selections may be submitted to polling server 10 and/or ballot box 290 (e.g., electronically and/or as a paper ballot).

During the selection at 240, the selections may be made, in some embodiments, by way of a web page presented at user equipment 20C and other data processing devices, where the voter can fill out choices or an editable form that the user can fill out. When the voter finishes vote selection 240, the cast ballot is submitted to a polling server 10 and/or ballot box 290. In some example embodiments, when the vote is submitted or cast, the cast ballots may be cryptographically sealed. This can include both encryption of data and use of cryptographic signatures. The cryptography may use public keys, private keys, or a combination of key types. The ballots may be digitally processed using techniques analogous to sealing paper ballots in signed envelopes where the envelope may be associated with a voter but that association is removed when the contents of the envelope are revealed.

The ballot box 290 may store voting results in a variety of ways. For example, the ballot box 290 may store the voting results as paper ballots, images, and/or in a digital form, for example, on a disk drive or flash memory card. In some example embodiments, the ballot box 290 is a replicated store, that is, copies of the data are stored on two or more separate storage devices, and when a change is made, the various copies are updated. One or more of the copies may be remote from the polling location. Data in the ballot box may be encrypted to prevent unauthorized access in the event of physical theft of a storage device or a breach of communications with system 100.

Referring again to 215, authentication may include a so-called "two-factor authentication," in some example embodiments. Two-factor authentication uses at least two out of three categories of authentication: knowledge of the user, a possession of the user, and a characteristic of the user. Examples of knowledge of the user include passwords, names, social security numbers, dates of birth, zip codes, and personal identification or registration numbers issued by an election authority. Some knowledge items may be sent to voters prior to the election, for example, via email or postal mail. Example possessions of the user include identification cards, such as smart cards. Example characteristics of the user include biometric characteristics, such as fingerprints. The system 100 may include sensors, readers, and the like appropriate for the categories of authentication used. For example, the self-service kiosk 30 may ask the user of user equipment 20C to provide additional information, such as a thumb print, birth date, and the like to comply with the two-factor authentication, although the authentication maybe based on the token 66 without additional input from the user as well. In some example embodiments, a poll worker may supervise the self-service kiosk 30 to confirm one or more aspects of the user of user equipment 20C as part of the authentication. For example, the polling official may ask for a photo ID of the voter.

In some example embodiments, the user equipment 20C is only able to authenticate with self-serve kiosk 30 and receive a ballot 69 when links 50C-D are configured as short range links, such as Bluetooth and/or WiFi, to enhance security.

In some example embodiments, the polling server 10 logs all or selected events including time-stamps for auditing.

Figure 3:
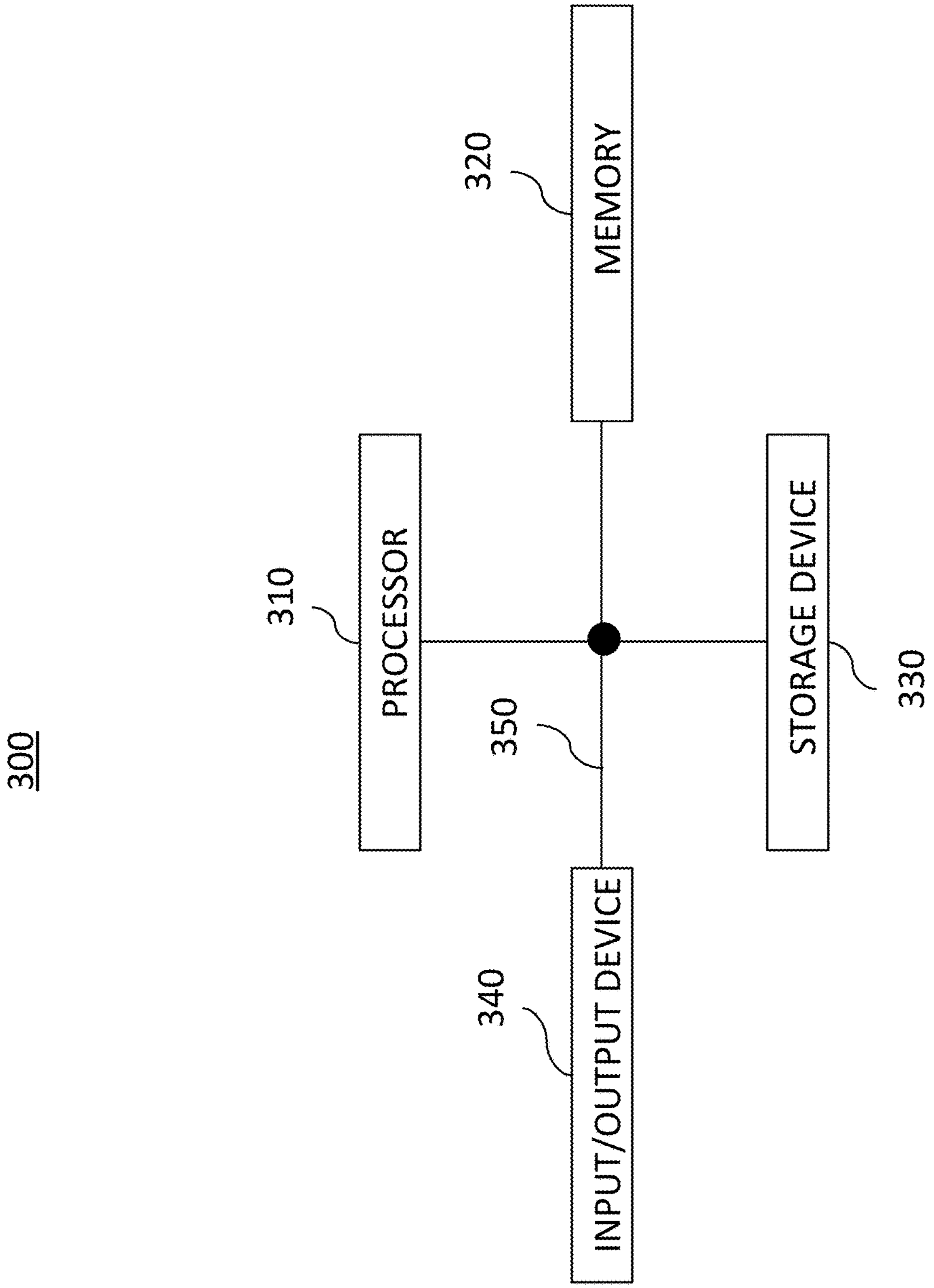
FIG. 3 is an example of an apparatus, in accordance with some example embodiments.

In some example embodiments, one or more of the devices disclosed herein, such as the user equipment 20C, voting station 20A-B, voting kiosk 30, and the like, may be configured to be implemented in a system 300, as shown in FIG. 3. The system 300 can include a processor 310, a memory 320, a storage device 330, and an input/output device 340. Each of the components 310, 320, 330 and 340 can be interconnected using a system bus 350. The processor 310 can be configured to process instructions for execution within the system 300. In some implementations, the processor 310 can be a single-threaded processor. In alternate implementations, the processor 310 can be a multi-threaded processor. The processor 310 can be further configured to process instructions stored in the memory 320 or on the storage device 330, including receiving or sending information through the input/output device 340. The memory 320 can store information within the system 300. In some implementations, the memory 320 can be a computer-readable medium. In alternate implementations, the memory 320 can be a volatile memory unit. In yet some implementations, the memory 320 can be a non-volatile memory unit. The storage device 330 can be capable of providing mass storage for the system 300. In some implementations, the storage device 330 can be a computer-readable medium. In alternate implementations, the storage device 330 can be a floppy disk device, a hard disk device, an optical disk device, a tape device, non-volatile solid-state memory, or any other type of storage device. The input/output device 340 can be configured to provide input/output operations for the system 300. In some implementations, the input/output device 340 can include a keyboard and/or pointing device. In alternate implementations, the input/output device 340 can include a display unit for displaying graphical user interfaces.

Although this disclosure generally describes voting for U.S. political elections, the systems and method described are applicable in many fields.

In some example embodiments, the voter registration repository, the ballot repository, and/or the ballot box may be kept at system 100, for example, stored on a disk drive coupled to polling server 10, at the election center 40, and/or at a combination of locations.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. As used herein, the term "user" can refer to any entity including a person or a computer. Other implementations may be within the scope of the following claims.

What is claimed:

1. A computer-implemented method, comprising:

authenticating, based at least on a token carried by a user equipment associated with a voter, the voter, the token being authenticated based at least on a mapping stored in a remote repository between the token and at least one of an identity of the voter, a precinct of the voter, and a ballot for the voter;

determining that the user equipment is connected to a voter kiosk via a short-range communication link and not a long-range communication link;

in response to the voter being authenticated and the user equipment of the voter being connected to the voter kiosk via the short-range communication link, sending, via the short-range communication link, an electronic representation of the ballot to the user equipment to enable the voter to input, via the user equipment, one or more selections associated with the ballot;

scanning a barcode displayed on the user equipment, the barcode encoding the one or more selections input by the voter at the user equipment;

generating, based at least on the scanned bar code, a graphic user interface displaying, at the voter kiosk, a preview of the one or more selections made by the voter; and in response to receiving a confirmation of the preview of the one or more selections made by the voter, tabulating the ballot based at least on the one or more selections input by the voter at the user equipment.

2. The computer-implemented method of claim 1, wherein the token is authenticated by at least querying the remote repository storing the mapping between the token and the at least one of the identity of the voter, the precinct of the voter, and the ballot for the voter.

3. The computer-implemented method of claim 1, further comprising:

sending, to the user equipment, the token in at least one of an email and a voter registration document.

4. The computer-implemented method of claim 1, further comprising:

scanning the token carried by the user equipment to enable the authentication of the voter based at least on the scanned token.

5. The computer-implemented method of claim 1, further comprising:

generating, based at least on the scanned bar code, a graphic user interface displaying a preview of the one or more selections made by the voter; and tabulating the ballot in response to receiving, from the voter, a confirmation of the preview of the one or more selections made by the voter.

6. A system comprising:

at least one data processor; and at least one memory storing instructions, which when executed by the at least one data processor, result in operations comprising:

authenticating, based at least on a token carried by a user equipment associated with a voter, the voter, the token authenticated based at least on a mapping stored in a remote repository between the token and at least one of an identity of the voter, a precinct of the voter, and a ballot for the voter;

determining that the user equipment is connected to a voter kiosk via a short-range communication link and not a long-range communication link;

in response to the voter being authenticated and the user equipment of the voter being connected to the voter kiosk via the short-range communication link, sending, via the short-range communication link, an electronic representation of the ballot to the user equipment to enable the voter to input, via the user equipment, one or more selections associated with the ballot;

scanning a barcode displayed on the user equipment, the barcode encoding the one or more selections input by the voter at the user equipment;

generating, based at least on the scanned bar code, a graphic user interface displaying, at the voter kiosk, a preview of the one or more selections made by the voter; and in response to receiving a confirmation of the preview of the one or more selections made by the voter, tabulating the ballot based at least on the one or more selections input by the voter at the user equipment.

7. The system of claim 6, wherein the token is authenticated by at least querying the remote repository storing the mapping between the token and the at least one of the identity of the voter, the precinct of the voter, and the ballot for the voter.

8. The system of claim 6, wherein the token is sent to the user equipment in at least one of an email and a voter registration document.

9. The system of claim 6, further comprising:

scanning the token carried by the user equipment to enable the authentication of the voter based at least on the scanned token.

10. The system of claim 6, further comprising:

generating, based at least on the scanned bar code, a graphic user interface displaying, at the voter kiosk, a preview of the one or more selections made by the voter; and tabulating the ballot in response to receiving, from the voter, a confirmation of the preview of the one or more selections made by the voter.

11. A non-transitory computer-readable storage medium storing instructions, which when executed by at least one data processor, result in operations comprising:

authenticating, based at least on a token carried by a user equipment associated with a voter, the voter, the token being authenticated based at least on a mapping stored in a remote repository between the token and at least one of an identity of the voter, a precinct of the voter, and a ballot for the voter;

determining that the user equipment is connected to a voter kiosk via a short-range communication link and not a long-range communication link;

in response to the voter being authenticated and the user equipment of the voter being connected to the voter kiosk via the short-range communication link, sending, via the short-range communication link, an electronic representation of the ballot to the user equipment to enable the voter to input, via the user equipment, one or more selections associated with the ballot;

scanning a barcode displayed on the user equipment, the barcode encoding the one or more selections input by the voter at the user equipment;

generating, based at least on the scanned bar code, a graphic user interface displaying, at the voter kiosk, a preview of the one or more selections made by the voter; and in response to receiving a confirmation of the preview of the one or more selections made by the voter, tabulating the ballot based at least on the one or more selections input by the voter at the user equipment.

12. The non-transitory computer-readable storage medium of claim 11, wherein the token is authenticated by at least querying the remote repository storing the mapping between the token and the at least one of the identity of the voter, the precinct of the voter, and the ballot for the voter.

13. The non-transitory computer-readable storage medium of claim 11, wherein the token is sent to the user equipment in at least one of an email and a voter registration document.

14. The non-transitory computer-readable storage medium of claim 11, further comprising:

scanning the token carried by the user equipment to enable the authentication of the voter based at least on the scanned token.

15. The non-transitory computer-readable storage medium of claim 11, further comprising:

generating, based at least on the scanned bar code, a graphic user interface displaying, at the voter kiosk, a preview of the one or more selections made by the voter; and tabulating the ballot in response to receiving, from the voter, a confirmation of the preview of the one or more selections made by the voter.

* * * * *